(12) United States Patent  (10) Patent No.: US 9,374,603 B1
Harris et al.  (45) Date of Patent: Jun. 21, 2016

(54) SYSTEMS AND METHODS FOR PROVIDING CONTENT DELIVERY OVER A BACKHAUL LINK IN A COMMUNICATION SYSTEM

(75) Inventors: David L. Harris, Pleasanton, CA (US); Walter F. Rausch, Shawnee, KS (US); Kosol Jintaseranee, Sunnyvale, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1731 days.

(21) Appl. No.: 12/103,391

(22) Filed: Apr. 15, 2008

(51) Int. Cl.
  *H04N 21/234* (2011.01)
  *H04N 21/472* (2011.01)
  *H04N 21/6587* (2011.01)
  *H04N 7/173* (2011.01)

(52) U.S. Cl.
  CPC ..... *H04N 21/23406* (2013.01); *H04N 7/17318* (2013.01); *H04N 7/17336* (2013.01); *H04N 21/47202* (2013.01); *H04N 21/6587* (2013.01)

(58) Field of Classification Search
  CPC .......... H04N 21/23406; H04N 21/47202; H04N 21/6587; H04N 7/17318; H04N 7/17336
  USPC ............. 725/81, 90, 94, 97–98, 103, 119
  See application file for complete search history.

(56) References Cited

U.S. PATENT DOCUMENTS

| | | | |
|---|---|---|---|
| 6,252,862 B1 | 6/2001 | Sauer et al. | |
| 6,611,510 B2 | 8/2003 | Famolari et al. | |
| 6,728,226 B1 | 4/2004 | Naito | |
| 6,760,756 B1 | 7/2004 | Davis et al. | |
| 6,865,167 B2 | 3/2005 | Famolari et al. | |
| 7,075,904 B1 | 7/2006 | Manish et al. | |
| 7,096,039 B2 | 8/2006 | Chuah et al. | |
| 7,111,316 B1* | 9/2006 | Zahorjan et al. | 725/97 |
| 7,461,262 B1* | 12/2008 | O'Toole, Jr. | 709/229 |
| 2002/0176377 A1 | 11/2002 | Hamilton | |
| 2002/0176378 A1 | 11/2002 | Hamilton et al. | |
| 2003/0005455 A1* | 1/2003 | Bowers | 725/90 |
| 2003/0037331 A1* | 2/2003 | Lee | 725/86 |
| 2003/0093544 A1* | 5/2003 | Richardson | 725/87 |
| 2005/0125836 A1* | 6/2005 | Estevez et al. | 725/105 |
| 2006/0095532 A1* | 5/2006 | O'Rourke et al. | 709/213 |
| 2006/0294555 A1* | 12/2006 | Xie | 725/88 |
| 2007/0058629 A1* | 3/2007 | Luft | 370/390 |
| 2007/0160048 A1* | 7/2007 | Faucheux et al. | 370/390 |
| 2010/0211689 A1* | 8/2010 | Bijwaard et al. | 709/228 |

* cited by examiner

*Primary Examiner* — Randy Flynn

(57) ABSTRACT

A method disclosed herein comprises receiving first content into a wireless access system from a backhaul link between the wireless access system and a service system, transmitting the first content from the wireless access system to a first device served by the wireless access system, receiving a second packet communication from a second device served by the wireless access system wherein the second packet communication includes a second content request, processing the second packet communication to determine a second content identifier included in the second content request, processing the second content identifier to determine if the second content is the same as the first content, buffering the first content and transmitting the buffered first content to the second device, and transferring the second packet communication to a communication network to obtain the second content.

17 Claims, 9 Drawing Sheets

SYSTEMS AND METHODS FOR PROVIDING CONTENT DELIVERY OVER A BACKHAUL LINK IN A COMMUNICATION SYSTEM

TECHNICAL BACKGROUND

Wireless communication services have become very popular, and many carriers, content providers, and other service providers endeavor to deliver such services. Users access wireless communication services using a wide variety of devices, such as mobile phones, personal computers, personal digital assistants, personal and personal media devices, as well as other types of devices. Accordingly, users have grown to enjoy the mobility provided by wireless communication services.

In a typical wireless environment, the provisioning and delivery of wireless communication services requires many different elements. In an example, a wireless communication service area can be defined by a radio frequency (RF) pattern generated by RF transmissions from a nearby access system. A wireless base station, sometimes referred to as a base transceiver stations (BTS), is an example of an access system. The access system is often times linked to a service system via a backhaul link, such as a T-1 link, an Ethernet link, or a wireless microwave link. The service system may include several processing elements, such as a base station controller, a mobile switching center (MSC), an access service node (ASN), or a gateway system, as well as other elements. The mobile station establishes a communication path via the access system and the service system to other communication networks to obtain wireless access to communication services, such as voice, video, and data services.

Many challenges exist to the delivery of high quality wireless service experiences. In particular, the growing popularity of high bandwidth applications, such as video downloads and streaming media applications, requires a large amount of bandwidth at each point along a communication path. For instance, the communication networks, service system, and access system, and the communication links between these elements, must have enough bandwidth to satisfy the demands of many customers that desire to access high bandwidth applications.

In one example, a user operating a mobile device may request a video from a web server located on the Internet. The mobile device communicates the request to the web server via an access system, backhaul link, and service system. The web server receives the video request, retrieves the appropriate video, and transfers the video to the mobile device. The video traverses the service system, backhaul link, and access system. Thus, sufficient bandwidth must exist at each point and on each link in the communication path between the web server and the mobile device to ensure a high quality viewing experience by the user. The lack of sufficient bandwidth can result in undesirable effects, such as jitter, lost packets, or delay, as well as other problems.

A lack of bandwidth at many points along a communication path can be addressed by adding equipment or obtaining additional communication links. In many cases, networks are overbuilt to ensure that sufficient bandwidth is always available. However, backhaul links are particularly expensive links along the communication path. Thus, wireless carriers generally utilize backhaul links as efficiently as possible.

Unfortunately, backhaul links can become a bottleneck when delivering wireless communication services to many users served by the same access system. In fact, it is not uncommon for hundreds of users within range of a single access system to attempt to reach the same destination, such as a website, nearly simultaneously. Such a mass even may occur in response to breaking news, new video releases, or the like.

Moreover, present data transfer rates accommodate average per-user throughput of 250 kilobits per second. At any given time, hundreds of users within the coverage area of a single access system may be streaming or downloading content. At the same time, the average backhaul bandwidth is 5 megabits per second, and streaming and downloading services account for the largest share of backhaul usage. Thus, at present backhaul capacity levels, only 20 average users can be adequately accommodated simultaneously. Even as backhaul bandwidth grows, demand for content will also grow, and so it will remain difficult to accommodate a large number of users simultaneously.

For example, several users each operating separate mobile devices may request high bandwidth video from web servers on the Internet. As discussed above, the video requests are communicated from the mobile devices to the web servers via an access system and service system. Each video is then transferred from the web servers to the mobile devices via the service system, backhaul link, and access system, thereby generating many redundant downloads over the serving backhaul link. If the backhaul link does not have sufficient bandwidth available for handling multiple video transfers, the user experience may suffer.

OVERVIEW

Methods, systems, and software are disclosed herein that, when employed to operate a communication system, help to achieve a more efficient use of backhaul links when multiple users served by the same access system requests the same content at nearly the same time. Rather than transfer multiple instances of the same content over the backhaul link, a single instance of the video can be transferred over the backhaul link to the access system. The access system can buffer the first instance of the content and transfer all or a portion of the buffered content to multiple users. In this manner, backhaul bandwidth is utilized more efficiently.

In an embodiment, a method of operating a communication system comprises receiving first content into a wireless access system from a backhaul link between the wireless access system and a service system, transmitting the first content from the wireless access system to a first device served by the wireless access system, receiving a second packet communication from a second device served by the wireless access system wherein the second packet communication includes a second content request, processing the second packet communication to determine a second content identifier included in the second content request wherein the second content identifier is associated with second content, processing the second content identifier to determine if the second content is the same as the first content, in response to determining that the second content is the same as the first content, buffering the first content and transmitting the buffered first content to the second device, and in response to determining that the second content is not the same as the first content, transferring the second packet communication to a communication network to obtain the second content.

In another embodiment, a communication system comprises a service system and a wireless access system coupled to the service system by a backhaul link. The wireless access system is configured to receive first content on the backhaul link from the service system, transmit the first content to a first device served by the wireless access system, receive a second packet communication from a second device served by the wireless access system, wherein the second packet communication includes a second content request, process the second packet communication to determine a second content identifier included in the second content request, wherein the second content identifier is associated with second content, process the second content identifier to determine if the second content is the same as the first content, in response to determining that the second content is the same as the first content, buffering the first content and transmitting the buffered first content to the second device, and in response to determining that the second content is not the same as the first content, transferring the second packet communication to a communication network to obtain the second content.

TECHNICAL DISCLOSURE

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
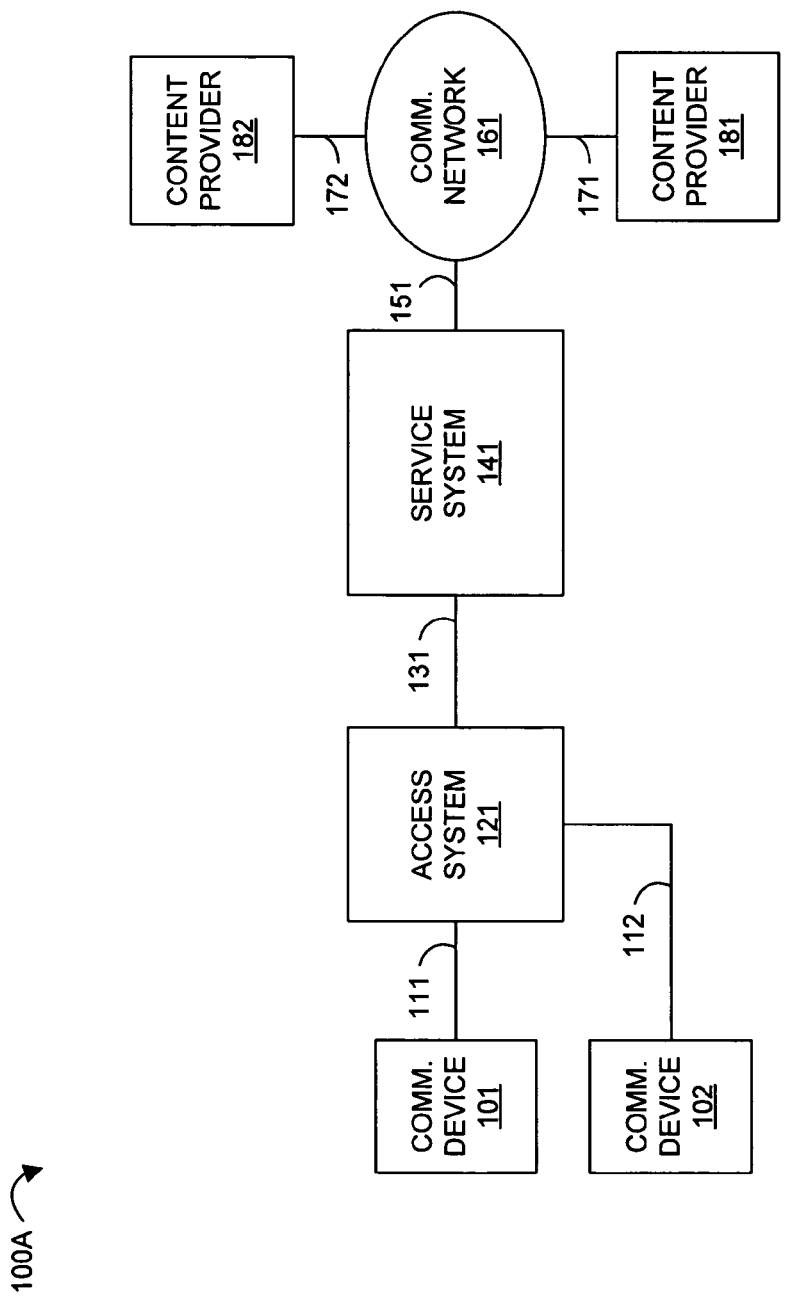
FIG. 1 is a block diagram illustrating a communication system.

Referring to FIG. 1, communication system 100A includes communication device 101, communication device 102, access system 121, service system 141, communication network 161, and content providers 181 and 182. In operation, communication devices 101 and 102 communicate with content providers 181 and 182 via access system 121, service system 141, and communication network 161 to obtain content, such as music, images, and video, as well as other types of digital data or content. Communication device 101 is in communication with access system 121 over wireless link 111. Communication device 102 communicates with access system 121 over wireless link 112. Access system 121 communicates with service system 141 over backhaul link 131. Service system 141 is in communication with communication network 161 over communication link 151. Communication network 161 communicates with content provider 181 over communication link 171.

Service system 141 comprises processors, circuitry, or other such elements capable of interfacing with access system 121 over backhaul link 131 and with communication network 161 over communication link 151. Examples of service system 141 include a mobile switching center, base station controller, packet data service node, access network gateway, access services network gateway, or other types of service systems, including any combination or variation thereof.

Access system 121 comprises processors, circuitry, or other such elements capable of interfacing with service system 141 over backhaul link 131 and with communication device 101 and 102 over wireless links 111 and 112 respectively. Examples of access system 121 include wireless base stations, base transceiver stations, repeaters, or other types of access systems, including any combination or variation thereof.

Communication network 161 comprises any network or collection of networks capable of exchanging communications with service system 141 and content providers 181 and 182 over communication links 151, 171, and 172 respectively. Examples of communication network 161 include internets, intranets, local area networks, or wide area networks, including any combinations or variations thereof.

Communication device 101 comprises a mobile phone, personal digital assistant, personal computer, or a pager, as well as another type of communication device or combination of communication devices. Communication device 101 includes processors, circuitry, and equipment, or other such software or hardware elements and interfaces capable of exchanging wireless communications with access system 121 over wireless link 111 in accordance with wireless communication protocols, such as, but not limited to, code division multiple access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), and Worldwide Interoperability for Microwave Access (WiMAX), as well as other protocols or combinations and variations thereof.

Likewise, communication device 102 comprises a mobile phone, personal digital assistant, personal computer, or a pager, as well as another type of communication device or combination of communication devices. Communication device 102 includes processors, circuitry, and equipment, or other such software or hardware elements and interfaces capable of exchanging wireless communications with access system 121 over wireless link 112 in accordance with wireless communication protocols, such as, but not limited to, CDMA 1×RTT, GSM, UMTS, HSPA, EV-DO, EV-DO rev. A, 3GPP LTE, and WiMAX, as well as other protocols or combinations and variations thereof.

Content providers 181 and 182 comprise systems, hardware, and software capable of storing and delivering content to communication devices 101 and 102. Examples of content providers 181 and 182 include web servers, application servers, as well as other computing systems, including any combinations or variations thereof.

Figure 2:
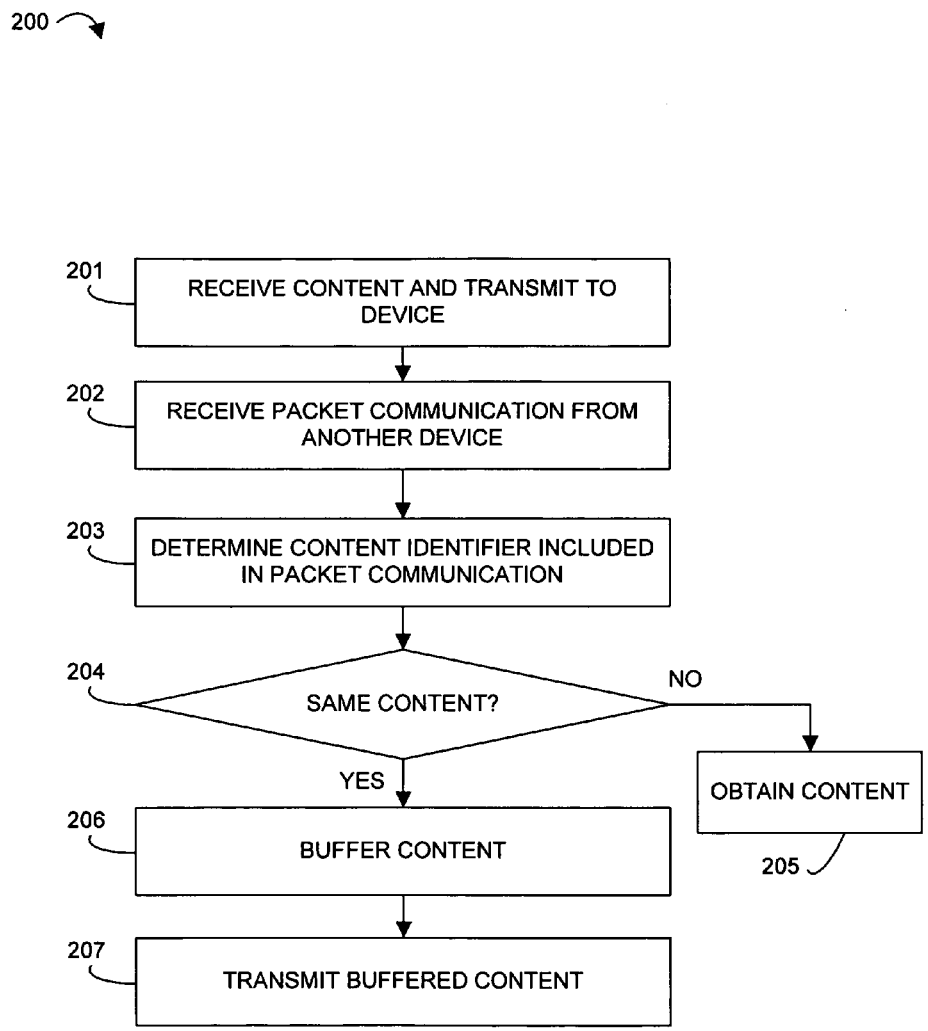
FIG. 2 is a flow chart illustrating a process for operating a communication system.

FIG. 2 illustrates process 200 for operating a communication system that may be employed to more efficiently utilize bandwidth on a backhaul link. It should be understood that process 200 could be performed by access system 121 or service system 141. It should be understood that access system 121 could perform the entirety of process 200. However, it should also be understood that part of process 200 could be performed by access system 121, while part could be performed by service system 141.

Process 200 can be deployed to monitor content requests made by communication devices for instances where the same content is requested by each device. Upon detecting requests for the same or similar content, the requested content is provided to each device, but by only exchanging one instance of the content over a backhaul link. In this manner, the bandwidth of the backhaul link can be allocated more efficiently, thereby conserving bandwidth for other communications.

Referring now to FIG. 2, content is received and transferred to a communication device (Step 201). Next, a packet communication is received from another communication device (Step 202). The packet communication is processed to determine a content identifier included in the packet communication (Step 203). The content identifier may comprise a network address, a uniform resource locator (URL) string, an internet protocol (IP) address, or a transport control protocol (TCP) port number, as well as any other type of content identifier, or combination of variations thereof.

Once the content identifier has been determined, the content identifier is processed to determine if the content identifier identifies the same content as was received and transferred to the communication device in Step 201 described above (Step 204). If so, the content being received and transferred to the communication device in Step 201 is buffered (Step 206). The buffered content is then transferred to the other communication device (Step 207). If not, the packet communication is transferred to obtain the requested content identified by the content identifier (Step 205). Eventually, the requested content is provided and transferred to the other communication device.

The following first refers to an example whereby access system 121 performs the entirety of process 200. Later, an example is provided whereby service system 141 performs at least part of process 200.

To begin, communication devices 101 and 102 each establish a communication session through access system 121 and service system 141 to communication network 161. Communication devices 101 and 102 establish the communication sessions in accordance with well known protocols and procedures used for initiating and maintaining such sessions. During the sessions, communication devices 101 and 102 exchange packet communications with destinations on communication network 161 via wireless links 111 and 112, access system 121, backhaul link 131, service system 141, and communication link 151.

From time to time, a user operating communication device 101 may desire to obtain content from content provider 181 or content provider 182. In response to a user input indicating this desire, communication device 101 generates and transfers a packet communication indicating a content request to obtain the content. In this example, it is assumed that the user desires content from content provider 181.

The content request is communicated from communication device 101 over wireless link 111 to access system 121. The content request is further communicated over backhaul link 131 to service system 141 and over communication links 151 and 171 and communication network 161 to content provider 181.

Content provider 181 receives and processes the content request to determine the content identified in the request. Content provider 181 then retrieves the content and transfers the content over communication links 171 and 151, communication network 161, service system 141, and backhaul link 131 to access system 121. Access system 121 transfers the content over wireless link 111 to communication device 101. Communication device 101 receives the content communicated by access system 121 and processes the content for presentation to the user. For example, communication device 101 plays out video and audio content, displays images, and opens files.

At times, another user operating communication device 102 may also wish to obtain content from content provider 181 or content provider 182. In response to a user input indicating this desire, communication device 102 generates and transfers a packet communication indicating a content request to obtain the content.

This packet communication is communicated from communication device 102 over wireless link 112 to access system 121. Access system 121 receives and processes the packet communication to determine the content identifier included in the packet communication. Next, access system 121 processes the content identifier to determine if the content identifier identifies the same content as was received and transferred to communication device 101.

If the requested content is the same as the previously requested content, access system 121 buffers the content being received and transferred to communication device 101. Access system 121 then transfers the buffered content to communication device 102. If the requested content is not the same as the previously requested content, then access system 121 transfers the packet communication to the appropriate destination on communication network 161 to obtain the requested content identified by the content identifier.

The following refers to an example whereby access system 121 performs a part of process 200 and service system 141 also performs at part of process 200. To begin, communication devices 101 and 102 each establish a communication session through access system 121 and service system 141 to communication network 161 in accordance with well known protocols and procedures used for initiating and maintaining such sessions. During the sessions, communication devices 101 and 102 exchange packet communications with destinations on communication network 161 via wireless links 111 and 112, access system 121, backhaul link 131, service system 141, and communication link 151.

A user operating communication device 101 may desire to obtain content from content provider 181 or content provider 182. In response to a user input indicating this desire, communication device 101 generates and transfers a packet communication indicating a content request to obtain the content. In this example, it is assumed that the user desires content from content provider 181.

The content request is communicated from communication device 101 over wireless link 111 to access system 121. The content request is further communicated over backhaul link 131 to service system 141 and over communication links 151 and 171 and communication network 161 to content provider 181.

Content provider 181 receives and processes the content request to determine the content identified in the request. Content provider 181 then retrieves the content and transfers the content over communication links 171 and 151, communication network 161, service system 141, and backhaul link 131 to access system 121. Access system 121 transfers the content over wireless link 111 to communication device 101. Communication device 101 receives the content communicated by access system 121 and processes the content for presentation to the user. For example, communication device 101 plays out video and audio content, displays images, and opens files.

Another user operating communication device 102 may also desire to obtain content from content provider 181 or content provider 182. In response to a user input indicating this desire, communication device 102 generates and transfers a packet communication indicating a content request to obtain the content.

This packet communication is communicated from communication device 102 over wireless link 112 to access system 121. Access system 121 receives transfers the packet communication to service system 141. Service system 141 receives and processes the packet communication to determine the content identifier included in the packet communication. Next, service system 141 processes the content identifier to determine if the content identifier identifies the same content as was received and transferred to communication device 101.

If the requested content is the same as the previously requested content, service system 141 transfers a control instruction to access system 121 instructing access system 121 to buffer the content being received and transferred to communication device 101. Access system 121, responsive to the control instructions, buffers the content being received and transferred to communication device 101. Access system 121 then transfers the buffered content to communication device 102. If the requested content is not the same as the previously requested content, then service system 141 transfers the packet communication to the appropriate destination on communication network 161 to obtain the requested content identified by the content identifier.

Figure 3:
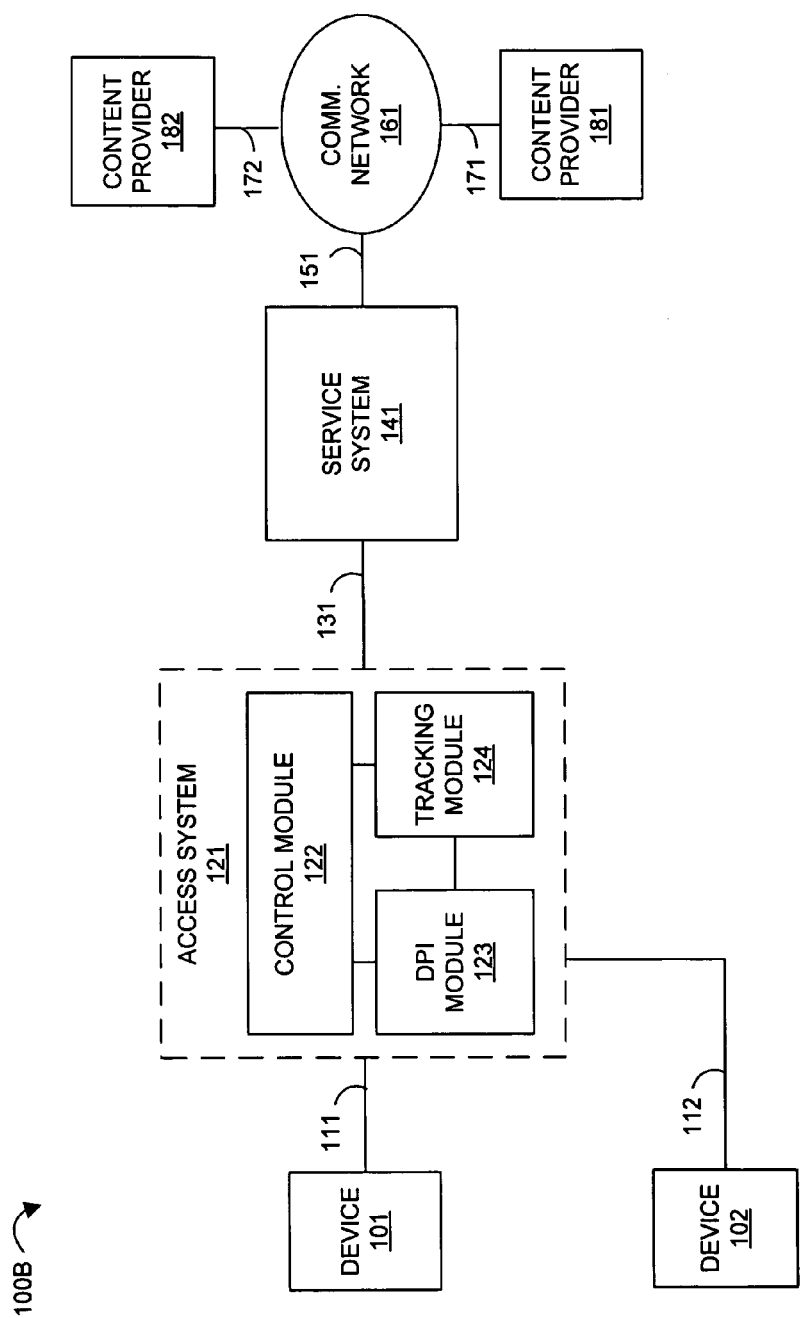
FIG. 3 is a block diagram illustrating a communication system.

Referring to FIG. 3, communication system 100B is illustrated. As shown in FIG. 3, communication system 100B includes device 101, device 102, access system 121, service system 141, communication network 161, content provider 181, and content provider 182.

As is further shown in FIG. 3, access system 121 includes control module 122, deep packet inspection (DPI) module 123, and tracking module 124. Control module 122, DPI module 123, and tracking module 124 comprise software modules that, when processed and executed by a processor, processing circuitry, firmware, or other such hardware, or any combination thereof, direct access system 121 to operate as described below for each module.

Figure 4:
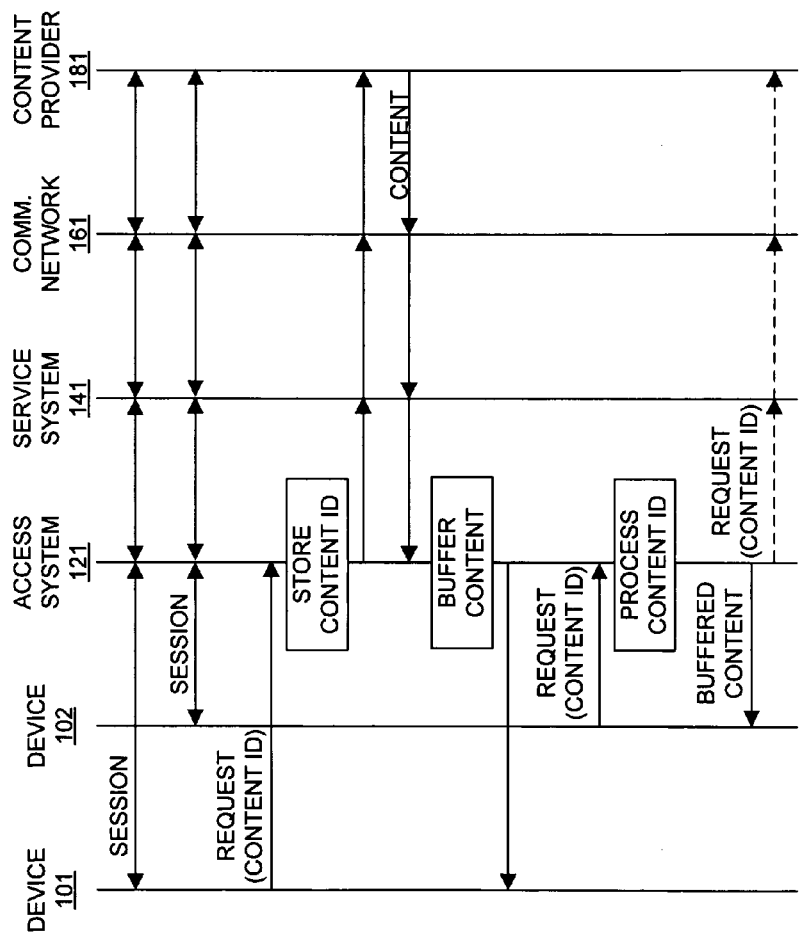
FIG. 4 is a flow diagram illustrating the operation of a communication system.

FIG. 4 illustrates a flow diagram that describes the operation of communication system 100B. In FIG. 4, communication devices 101 and 102 each establish a communication session through access system 121 and service system 141 to communication network 161. Communication devices 101 and 102 establish the communication sessions in accordance with well known protocols and procedures used for initiating and maintaining such sessions. During the sessions, communication devices 101 and 102 exchange packet communications with destinations on communication network 161 via wireless links 111 and 112, access system 121, backhaul link 131, service system 141, and communication link 151.

From time to time, a user operating communication device 101 may desire to obtain content from content provider 181 or content provider 182. In response to a user input indicating this desire, communication device 101 generates and transfers a packet communication indicating a content request to obtain the content. In this example, it is assumed that the user desires content from content provider 181.

The content request is communicated from communication device 101 over wireless link 111 to access system 121. DPI module 123 in access system 121 processes the content request using deep packet inspection to determine the content identifier included in the content request. DPI module 123 communicates the content identifier to tracking module 124. Tracking module 124 stores the content identifier for later comparison to other content requests. The content request is further communicated over backhaul link 131 to service system 141. Service system 141 transfers the content request over communication links 151 and 171 and communication network 161 to content provider 181.

Content provider 181 receives and processes the content request to determine the content identified in the request. Content provider 181 then retrieves the content and transfers the content over communication links 171 and 151, communication network 161, service system 141, and backhaul link 131 to access system 121. Access system 121 transfers the content over wireless link 111 to communication device 101. Communication device 101 receives the content communicated by access system 121 and processes the content for presentation to the user. For example, communication device 101 plays out video and audio content, displays images, and opens files.

At times, another user operating communication device 102 may also desire to obtain content from content provider 181 or content provider 182. In response to a user input indicating this desire, communication device 102 generates and transfers a packet communication indicating a content request to obtain the content.

This packet communication is communicated from communication device 102 over wireless link 112 to access system 121. In access system 121, the packet communication is received and DPI module 123 processes the packet communication to determine the content identifier included in the packet communication. DPI module 123 passes the content identifier to tracking module 124. Tracking module 124 processes the content identifier to determine if the content identifier identifies the same content as was received and transferred to communication device 101. Tracking module 124 communicates this result to control module 122. If the requested content is the same as the previously requested content, control module 122 directs access system 121 to buffer the content being received and transferred to communication device 101. Access system 121 then transfers the buffered content to communication device 102. If the requested content is not the same as the previously requested content, control module 122 directs access system 121 to transfer the packet communication to service system 141. Service system 141 transfers the packet communication to the appropriate destination on communication network 161 to obtain the requested content identified by the content identifier.

Figure 5:
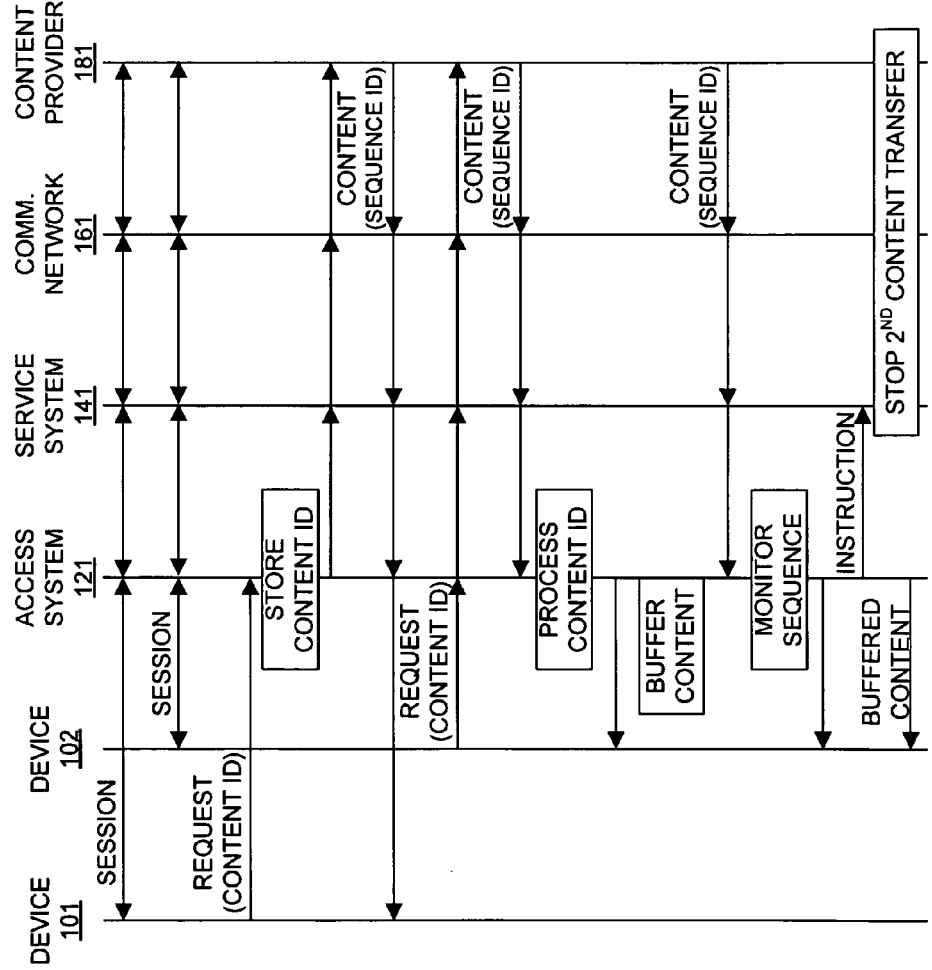
FIG. 5 is a flow diagram illustrating the operation of a communication system.

FIG. 5 illustrates another flow diagram that describes the operation of communication system 100B in another embodiment. In FIG. 5, communication devices 101 and 102 each establish a communication session through access system 121 and service system 141 to communication network 161. Communication devices 101 and 102 establish the communication sessions in accordance with well known protocols and procedures used for initiating and maintaining such sessions. During the sessions, communication devices 101 and 102 exchange packet communications with destinations on communication network 161 via wireless links 111 and 112, access system 121, backhaul link 131, service system 141, and communication link 151.

A user operating communication device 101 may wish to obtain content from content provider 181 or content provider 182. In response to a user input indicating this desire, communication device 101 generates and transfers a packet communication indicating a content request to obtain the content. In this example, it is assumed that the user desires content from content provider 181.

The content request is communicated from communication device 101 over wireless link 111 to access system 121. In access system 121, DPI module 123 processes the content request to determine the content identifier included in the content request. DPI module 123 passes the content identifier to tracking module 124 for later comparison to other content identifiers. The content request is further communicated over backhaul link 131 to service system 141. Service system 141 transfers the content request over communication links 151 and 171 and communication network 161 to content provider 181.

Content provider 181 receives and processes the content request to determine the content identified in the request. Content provider 181 then retrieves the content and transfers the content over communication links 171 and 151, communication network 161, service system 141, and backhaul link 131 to access system 121. Access system 121 transfers the content over wireless link 111 to communication device 101. It should be understood that access system 121 may not necessarily process the content request to determine and store the content identifier, as discussed above. Rather, access system 121 could process the content as it is transferred from content provider 181 to communication device 101.

In this example, content provider 181 transfers the content in packets having a sequence. Each packet includes a sequence identifier that identifies the location of each packet in the sequences. The packets are transferred with the sequence identifiers from content provider 181 to communication device 101. It should be understood that the sequence identifiers could be included with the content received by communication device 101. However, it should also be understood that the sequence identifiers could be stripped from the content prior to reaching communication device 101. Communication device 101 receives the content communicated by access system 121 and processes the content for presentation to the user. For example, communication device 101 plays out video and audio content, displays images, and opens files.

Later on, another user operating communication device 102 may also desire to obtain content from content provider 181 or content provider 182. In response to a user input indicating this desire, communication device 102 generates and transfers a packet communication indicating a content request to obtain the content.

This packet communication is communicated from communication device 102 over wireless link 112 to access system 121. In access system 121, DPI module 123 processes the packet communication to determine the content identifier included in the packet communication. DPI module 123 passes the content identifier to tracking module 124. Tracking module 124 processes the content identifier to determine if the content identifier identifies the same content as was received and transferred to communication device 101. Tracking module 124 provides this result to control module 122. If the requested content is the same as the previously requested content, control module 122 directs access system 121 to buffer the content being received and transferred to communication device 101.

At or near the same time, access system 121 transfers the packet communication to service system 141, which in turn transfers the packet communication to the appropriate destination on communication network 161 to obtain the requested content identified by the content identifier. In this example, the content request is sent to content provider 181, as content provider 181 has the content requested by the user operating communication device 102.

Content provider 181 then retrieves a second instance of the content and transfers the second instance of the content over communication links 171 and 151, communication network 161, service system 141, and backhaul link 131 to access system 121. Access system 121 transfers the second instance of the content over wireless link 111 to communication device 102.

In this example, content provider 181 transfers the second instance of the content in packets having a sequence. Each packet includes a sequence identifier that identifies the location of each packet in the sequences. The packets are transferred with the sequence identifiers from content provider 181 to communication device 102. It should be understood that the sequence identifiers could be included with the content received by communication device 102. However, it should also be understood that the sequence identifiers could be stripped from the content prior to reaching communication device 102.

Communication device 102 receives the second instance of the content communicated by access system 121 and processes the content for presentation to the user. For example, communication device 102 plays out video and audio content, displays images, and opens files.

In the meantime, content provider 181 now must transfer two instances of the same content to communication devices 101 and 102. The first instance of the content, that which is transferred to communication device 101, is not synchronized with the second instance of the content that is transferred to communication device 102 because the user operating communication device 101 requested the content prior to when the user operating communication device 102 requested the content. That is, the version of the content transferred to communication device 101 arrives at access system 121 earlier in time than the version of the content transferred to communication device 102.

As a result, in access system 121, control module 122 determines to buffer the first instance of the content after some of the content has already been transferred to communication device 101. Thus, while nearly all of the first instance of the content could be buffered, at least some of the content will have been transferred to communication device 101 without buffering.

In order to provide the second user with all of the requested content, some of the second instance of the content must be transferred to communication device 102. To do so, control module 122 monitors the sequence of the packets carrying the second instance of the content for the point in the sequence of the second instance of the content corresponding to the earliest point in the sequence of the first instance of the content that was buffered. When the sequence of the second instance of the content reaches the point in the first instance of the content where buffering began, control module 122 directs access system 121 to transfer a control instruction to service system 141 to stop the transfer of the second instance of the content. Control module 122 then directs access system 121 then begins to transfer the buffered copy of the first instance of the content to communication device 102.

Figure 6:
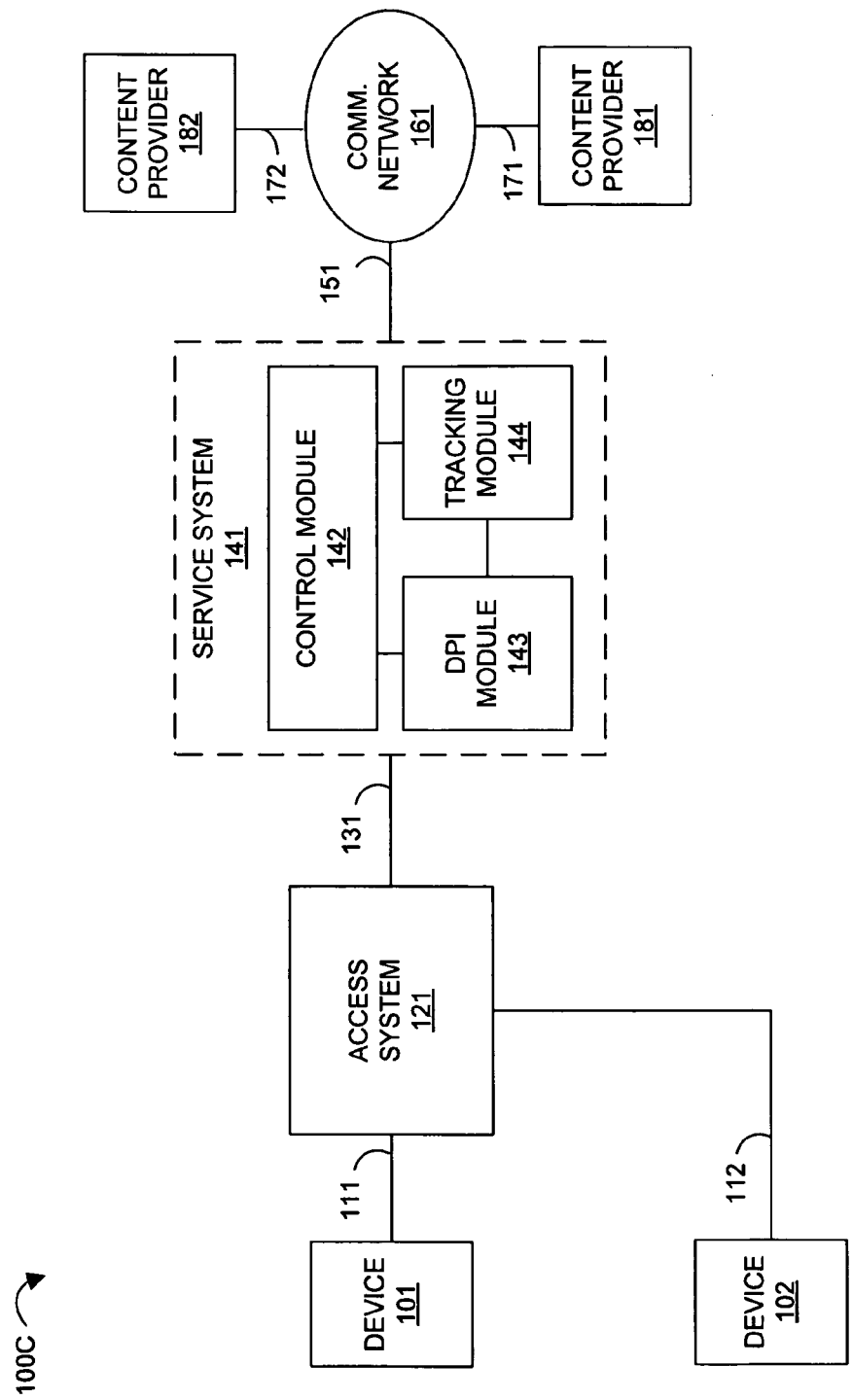
FIG. 6 is a block diagram illustrating the operation of a communication system.

Referring to FIG. 6, communication system 100C is illustrated. As shown in FIG. 6, communication system 100C includes device 101, device 102, access system 121, service system 141, communication network 161, content provider 181, and content provider 182.

As is further shown in FIG. 6, service system 141 includes control module 142, deep packet inspection (DPI) module 143, and tracking module 144. Control module 142, DPI module 143, and tracking module 144 comprise software modules that, when processed and executed by a processor, processing circuitry, firmware, or other such hardware, or any combination thereof, direct service system 141 to operate as described below for each module.

Figure 7:
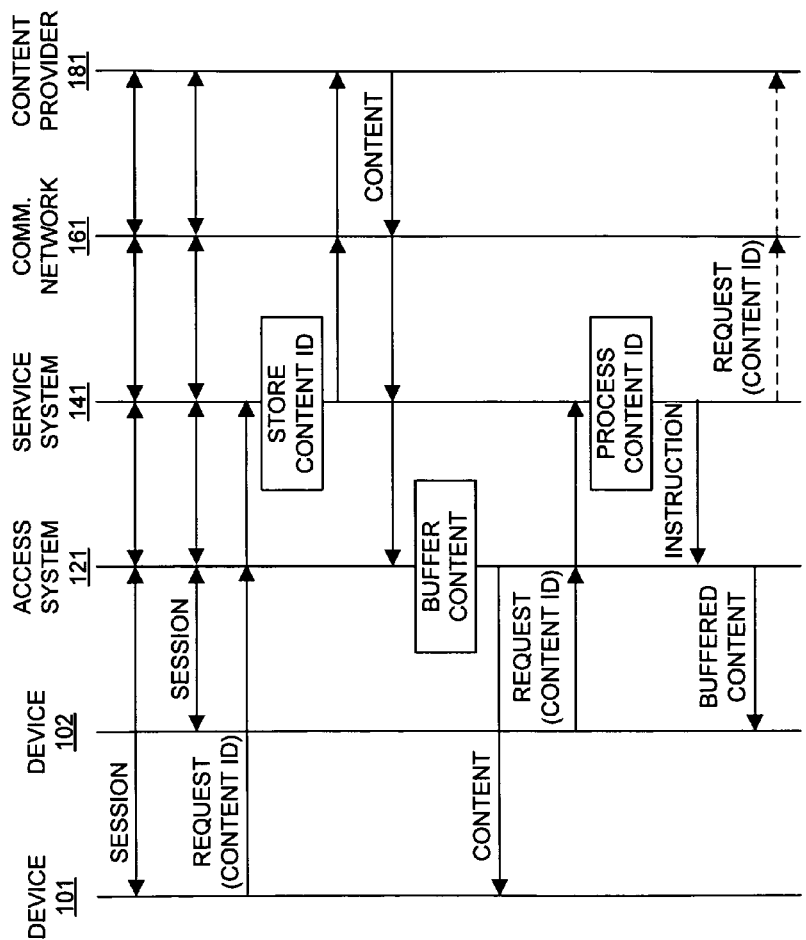
FIG. 7 is a flow diagram illustrating the operation of a communication system.

FIG. 7 illustrates a flow diagram that describes the operation of communication system 100C in an alternative. In FIG. 7, communication devices 101 and 102 each establish a communication session through access system 121 and service system 141 to communication network 161. Communication devices 101 and 102 establish the communication sessions in accordance with well known protocols and procedures used for initiating and maintaining such sessions. During the sessions, communication devices 101 and 102 exchange packet communications with destinations on communication network 161 via wireless links 111 and 112, access system 121, backhaul link 131, service system 141, and communication link 151.

Initially, a user operating communication device 101 may desire to obtain content from content provider 181 or content provider 182. In response to a user input indicating this desire, communication device 101 generates and transfers a packet communication indicating a content request to obtain the content. In this example, it is assumed that the user desires content from content provider 181.

The content request is communicated from communication device 101 over wireless link 111 to access system 121. Access system 121 transfers the content request to service system 141. In service system 141, DPI module 143 processes the content request to determine the content identifier included in the content request. DPI module 143 passes the content identifier to tracking module 144 for later comparison to other content requests. Service system 141 further transfers the content request over communication links 151 and 171 and communication network 161 to content provider 181.

Content provider 181 receives and processes the content request to determine the content identified in the request. Content provider 181 then retrieves the content and transfers the content over communication links 171 and 151, communication network 161, service system 141, and backhaul link 131 to access system 121. Access system 121 transfers the content over wireless link 111 to communication device 101. Communication device 101 receives the content communicated by access system 121 and processes the content for presentation to the user. For example, communication device 101 plays out video and audio content, displays images, and opens files.

At times, another user operating communication device 102 may also desire to obtain content from content provider 181 or content provider 182. In response to a user input indicating this desire, communication device 102 generates and transfers a packet communication indicating a content request to obtain the content.

This packet communication is communicated from communication device 102 over wireless link 112 to access system 121. Access system 121 transfers the packet communication to service system 141. Service system 141 receives the packet communication. DPI module 143 processes the packet communication to determine the content identifier included in the packet communication. DPI module 143 passes the content identifier to tracking module 144. Tracking module 144 processes the content identifier to determine if the content identifier identifies the same content as was received and transferred to communication device 101. Tracking module 144 provides this result to control module 142. If the requested content is the same as the previously requested content, control module 142 directs service system 141 to generate and transfer a control instruction to access system 121 instructing access system 121 to buffer the content being received and transferred to communication device 101. Access system 121 receives the control instruction and responsively buffers the indicated content. Access system 121 then transfers the buffered content to communication device 102. If the requested content is not the same as the previously requested content, control module 122 directs service system 121 to transfer the packet communication to the appropriate destination on communication network 161 to obtain the requested content identified by the content identifier.

Figure 8:
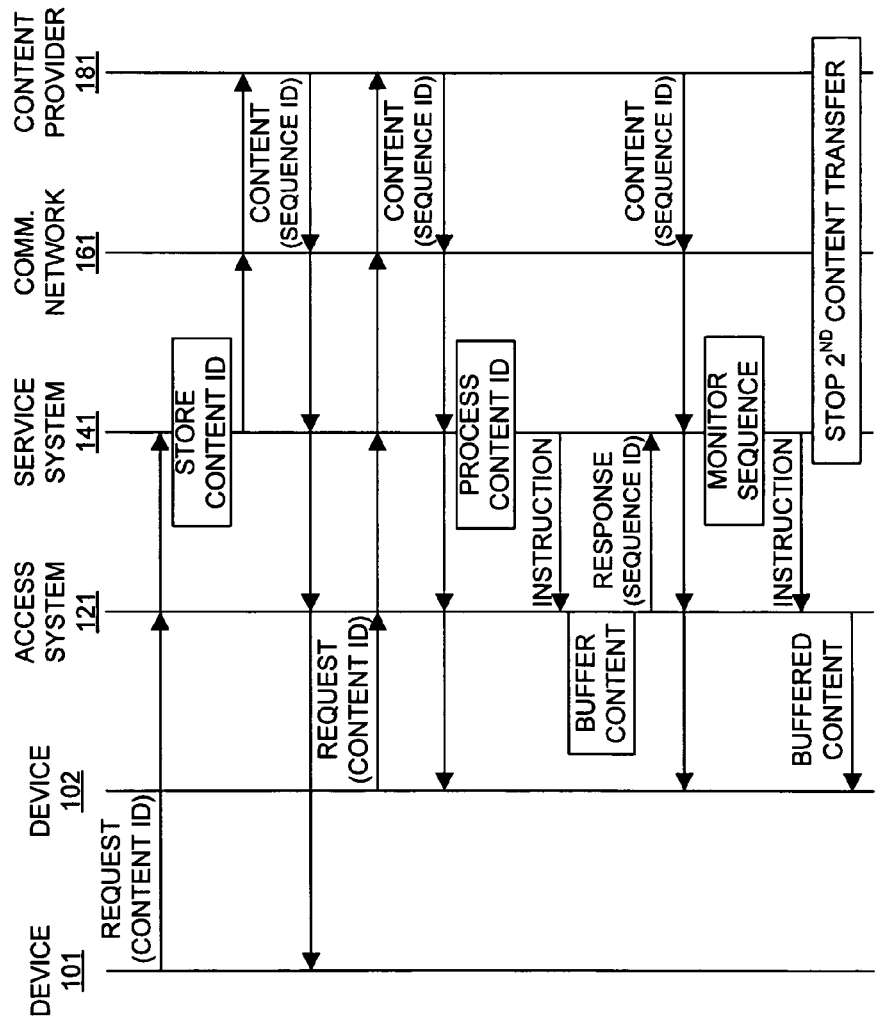
FIG. 8 is a flow diagram illustrating the operation of a communication system.
Figure 9:
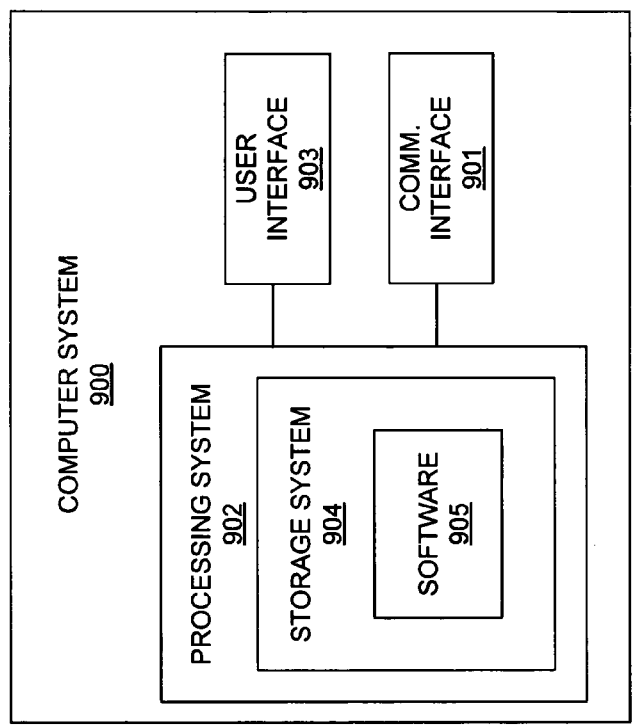
FIG. 9 is a block diagram illustrating a computer system.

FIG. 8 illustrates another flow diagram that describes the operation of communication system 100C in yet another embodiment. In FIG. 8, communication devices 101 and 102 each establish a communication session through access system 121 and service system 141 to communication network 161. Communication devices 101 and 102 establish the communication sessions in accordance with well known protocols and procedures used for initiating and maintaining such sessions. During the sessions, communication devices 101 and 102 exchange packet communications with destinations on communication network 161 via wireless links 111 and 112, access system 121, backhaul link 131, service system 141, and communication link 151.

A user operating communication device 101 may desire to obtain content from content provider 181 or content provider 182. In response to a user input indicating this desire, communication device 101 generates and transfers a packet communication indicating a content request to obtain the content. In this example, it is assumed that the user desires content from content provider 181.

The content request is communicated from communication device 101 over wireless link 111 to access system 121. The content request is further communicated over backhaul link 131 to service system 141. In system 141, DPI module 143 processes the content request to determine the content identifier included in the content request. DPI module 143 provides the content identifier to tracking module 144 for later comparison to other content requests. Service system 141 transfers the content request over communication links 151 and 171 and communication network 161 to content provider 181.

Content provider 181 receives and processes the content request to determine the content identified in the request. Content provider 181 then retrieves the content and transfers the content over communication links 171 and 151, communication network 161, service system 141, and backhaul link 131 to access system 121. Access system 121 transfers the content over wireless link 111 to communication device 101. It should be understood that service system 141 may not necessarily process the content request to determine and store the content identifier, as discussed above. Rather, service system 141 could process the content as it is transferred from content provider 181 to communication device 101.

In this example, content provider 181 transfers the content in packets having a sequence. Each packet includes a sequence identifier that identifies the location of each packet in the sequences. The packets are transferred with the sequence identifiers from content provider 181 to communication device 101. It should be understood that the sequence identifiers could be included with the content received by communication device 101. However, it should also be understood that the sequence identifiers could be stripped from the content prior to reaching communication device 101. Communication device 101 receives the content communicated by access system 121 and processes the content for presentation to the user. For example, communication device 101 plays out video and audio content, displays images, and opens files.

At times, another user operating communication device 102 may also desire to obtain content from content provider 181 or content provider 182. In response to a user input indicating this desire, communication device 102 generates and transfers a packet communication indicating a content request to obtain the content.

This packet communication is communicated from communication device 102 over wireless link 112 to access system 121. Access system 121 further communicates the packet communication to service system 141. In service system 141, DPI module 143 receives and processes the packet communication to determine the content identifier included in the packet communication. DPI module 143 transfers the content identifier to tracking module 144. Tracking module 144 processes the content identifier to determine if the content identifier identifies the same content as was received and transferred to communication device 101. Tracking module 144 provides this result to control module 142. If the requested content is the same as the previously requested content, control module 142 directs service system 141 to generate and transfer a control instruction to access system 121 instructing access system 121 to buffer the content being received and transferred to communication device 101. In response to the control instruction, access system 121 buffers the indicated content.

At or near the same time, service system 141 transfers the packet to the appropriate destination on communication network 161 to obtain the requested content identified by the content identifier. In this example, the content request is sent to content provider 181, as content provider 181 has the content requested by the user operating communication device 102.

Content provider 181 then retrieves a second instance of the content and transfers the second instance of the content over communication links 171 and 151, communication network 161, service system 141, and backhaul link 131 to access system 121. Access system 121 transfers the second instance of the content over wireless link 111 to communication device 102.

In this example, content provider 181 transfers the second instance of the content in packets having a sequence. Each packet includes a sequence identifier that identifies the location of each packet in the sequences. The packets are transferred with the sequence identifiers from content provider 181 to communication device 102. It should be understood that the sequence identifiers could be included with the content received by communication device 102. However, it should also be understood that the sequence identifiers could be stripped from the content prior to reaching communication device 102.

Communication device 102 receives the second instance of the content communicated by access system 121 and processes the content for presentation to the user. For example, communication device 102 plays out video and audio content, displays images, and opens files.

In the meantime, content provider 181 now must transfer two instances of the same content to communication devices 101 and 102. The first instance of the content, that which is transferred to communication device 101, is not synchronized with the second instance of the content that is transferred to communication device 102 because the user operating communication device 101 requested the content prior to when the user operating communication device 102 requested the content. That is, the version of the content transferred to communication device 101 arrives at access system 121 earlier in time than the version of the content transferred to communication device 102.

As a result, access system 121 begins to buffer the first instance of the content after at least a portion of the first content has already been transferred to communication device 101. Thus, while nearly all of the first instance of the content could be buffered, at least a portion of the content will have been transferred to communication device 101 without buffering. If communication device 102 were only provided with the buffered portions of the first content, then the early portions of the first content would not be available to communication device 102.

In order to avoid this scenario, access system 121 informs service system 141 of the point in the sequence of the first instance of the content corresponding to when the buffering process begins. Access system 121 identifies the sequence in a response message transferred to service system 141. In service system 141, control module 142 monitors the sequence of the packets carrying the second instance of the content for the point in the sequence of the second instance of the content corresponding to the earliest point in the sequence of the first instance of the content that was buffered. When the sequence of the second instance of the content reaches the point in the first instance of the content where buffering began, control module 142 directs service system 141 to transfer a control instruction to access system 121 to begin transferring the buffered content to communication device 102. Control module 142 also directs service system 141 to stop the transfer of the second instance of the content. Access system 121 responsively begins to transfer the buffered copy of the first instance of the content to communication device 102.

Computer system 900 includes communication interface 901, processing system 902, and user interface 903. Processing system 902 includes storage system 904. Storage system 904 stores software 905. Processing system 902 is linked to communication interface 901 and user interface 903. Computer system 900 could be comprised of a programmed general-purpose computer, although those skilled in the art will appreciate that programmable or special purpose circuitry and equipment may be used. Computer system 900 may be distributed among multiple devices that together comprise elements 901-905.

Communication interface 901 could comprise a network interface, modem, port, transceiver, or some other communication device. Communication interface 901 may be distributed among multiple communication devices. Processing system 902 could comprise a computer microprocessor, logic circuit, or some other processing device. Processing system 902 may be distributed among multiple processing devices. User interface 903 could comprise a keyboard, mouse, voice recognition interface, microphone and speakers, graphical display, touch screen, or some other type of user device. User interface 903 may be distributed among multiple user devices. It should be understood that user interface 903 is optional and some computer systems may be implemented without such a user interface. Storage system 904 could comprise a disk, tape, integrated circuit, server, or some other memory device. Storage system 904 may be distributed among multiple memory devices.

Processing system 902 retrieves and executes software 905 from storage system 904. Software 905 may comprise an operating system, utilities, drivers, networking software, and other software typically loaded onto a computer system. Software 905 could comprise an application program, firmware, or some other form of machine-readable processing instructions. When executed by processing system 902, software 905 directs processing system 902 to operate as described herein for communication device 101 and 102, access system 121, and service system 141, as well as other systems and elements described herein.

As should be understood from the description above, communication systems 100A, 100B, and 100C advantageously provide for monitoring content requests made by communication devices for instances where the same content is requested by each device. Upon detecting requests for the same or similar content, the requested content is provided to each device, but by only exchanging one instance of the content over a backhaul link. In this manner, the bandwidth of backhaul link can be allocated more efficiently, thereby conserving bandwidth for other applications.

The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   receiving first content into a base transceiver station (BTS) from a backhaul link between the BTS and a base station controller (BSC) remote from the BTS;
   transmitting the first content from the BTS to a first device served by the BTS;
   receiving a second packet communication from a second device served by the BTS wherein the second packet communication includes a second content request;
   processing the second packet communication to determine a second content identifier included in the second content request wherein the second content identifier is associated with second content;
   processing the second content identifier to determine if the second content is the same as the first content;
   in response to determining that the second content is the same as the first content, generating and transferring a control instruction from the BSC to the BTS instructing the BTS to begin buffering the first content;
   buffering the first content at the BTS, and transmitting the buffered first content to the second device; and
   in response to determining that the second content is not the same as the first content, transferring the second packet communication to a communication network to obtain the second content.

2. The method of claim 1 further comprising:
   receiving a first packet communication from the first device wherein the first packet communication includes a first content request; and
   processing the first packet communication using deep packet inspection to determine a first content identifier included in the first content request wherein the first content identifier is associated with the first content;
   wherein processing the second packet communication to determine the second content identifier included in the second content request comprises performing deep packet inspection of the second packet communication.

3. The method of claim 1 wherein the first content has a first sequence and wherein the BTS begins to buffer the first content at a first intermediate point in the first sequence.

4. The method of claim 3 further comprising, in the BSC, transferring the second content request to obtain the second content, receiving the second content, and transferring the second content to the BTS.

5. The method of claim 4 wherein the second content has a second sequence and wherein the method further comprises, in the BTS, receiving the second content, transferring the second content to the second device from the beginning of the second sequence to a second intermediate point in the second sequence that corresponds to the first intermediate point in the first sequence, and transferring the buffered first content to the second device upon reaching the second intermediate point in the second sequence.

6. The method of claim 5 further comprising, in the BTS, transmitting another control instruction to the BSC upon reaching the second intermediate point in the second sequence, and in the BSC, receiving the other control instruction and stopping the transfer of the second content to the BTS in response to the other control instruction.

7. The method of claim 1 wherein the first content comprises packet video content.

8. The communication system of claim 1 wherein the first content comprises packet video content.

9. The method of claim 1 wherein the backhaul link comprises a T-1 link, an Ethernet link, or a wireless microwave link.

10. A communication system comprising:
    a base station controller (BSC); and
    a base transceiver station (BTS) remote from and coupled to the BSC by a backhaul link comprising a T-1 link, an Ethernet link, or a wireless microwave link and configured to:
       receive first content on the backhaul link from the BSC;
       transmit the first content to a first device served by the BTS; and
       receive a second packet communication from a second device served by the BTS, wherein the second packet communication includes a second content request;
    the BSC configured to:
       process the second packet communication to determine a second content identifier included in the second content request, wherein the second content identifier is associated with second content;
       process the second content identifier to determine if the second content is the same as the first content; and
       in response to determining that the second content is the same as the first content, generate and transfer a control instruction to the BTS instructing the BTS to begin buffering the first content;
    the BTS further configured to:
       in response to receiving the control instruction from the BSC, buffer the first content and transmit the buffered first content to the second device; and
       transfer the second packet communication to a communication network to obtain the second content if the control instruction is not received.

11. The communication system of claim 10 wherein the BSC is further configured to:
    receive a first packet communication from the BTS, wherein the first packet communication includes a first content request, and
    process the first packet communication using deep packet inspection to determine a first content identifier included in the first content request wherein the first content identifier is associated with the first content;
    wherein, to process the second packet communication to determine the second content identifier included in the second content request, the BSC is configured to perform deep packet inspection of the second packet communication.

12. The communication system of claim 10 wherein the first content has a first sequence and wherein the BTS begins to buffer the first content at a first intermediate point in the first sequence.

13. The communication system of claim 12 wherein the BSC is further configured to transfer the second content request to obtain the second content, receive the second content, and transfer the second content to the BTS.

14. The communication system of claim 13 wherein the second content has a second sequence, and wherein the BTS is further configured to receive the second content, transfer the second content to the second device from the beginning of the second sequence to a second intermediate point in the second sequence that corresponds to the first intermediate point in the first sequence, and transfer the buffered first content to the second device upon reaching the second intermediate point in the second sequence.

15. The communication system of claim 14 wherein the BTS is further configured to transmit another control instruction to the BSC upon reaching the second intermediate point in the second sequence, and wherein the BSC is further configured to receive the other control instruction and stop the transfer of the second content to the BTS in response to the other control instruction.

16. A non-transitory computer readable medium having instructions stored thereon that, when executed by a base transceiver station (BTS), direct the BTS to:
receive first content on a backhaul link from a base station controller (BSC) remote from the BTS;
transmit the first content to a first device;
receive a second packet communication from a second device, wherein the second packet communication includes a second content request;
process the second packet communication to determine a second content identifier included in the second content request, wherein the second content identifier is associated with second content;
process the second content identifier to determine if the second content is the same as the first content;
in response to determining that the second content is the same as the first content, generate and transfer a control instruction from the BSC instructing the BTS to begin buffering the first content;
buffer the first content and transmit the buffered first content to the second device; and
in response to determining that the second content is not the same as the first content, transfer the second packet communication to a communication network to obtain the second content.

17. The non-transitory computer readable medium of claim 16 wherein the backhaul link comprises a T-1 link, an Ethernet link, or a wireless microwave link.

* * * * *